United States Patent Office 3,514,624
Patented May 26, 1970

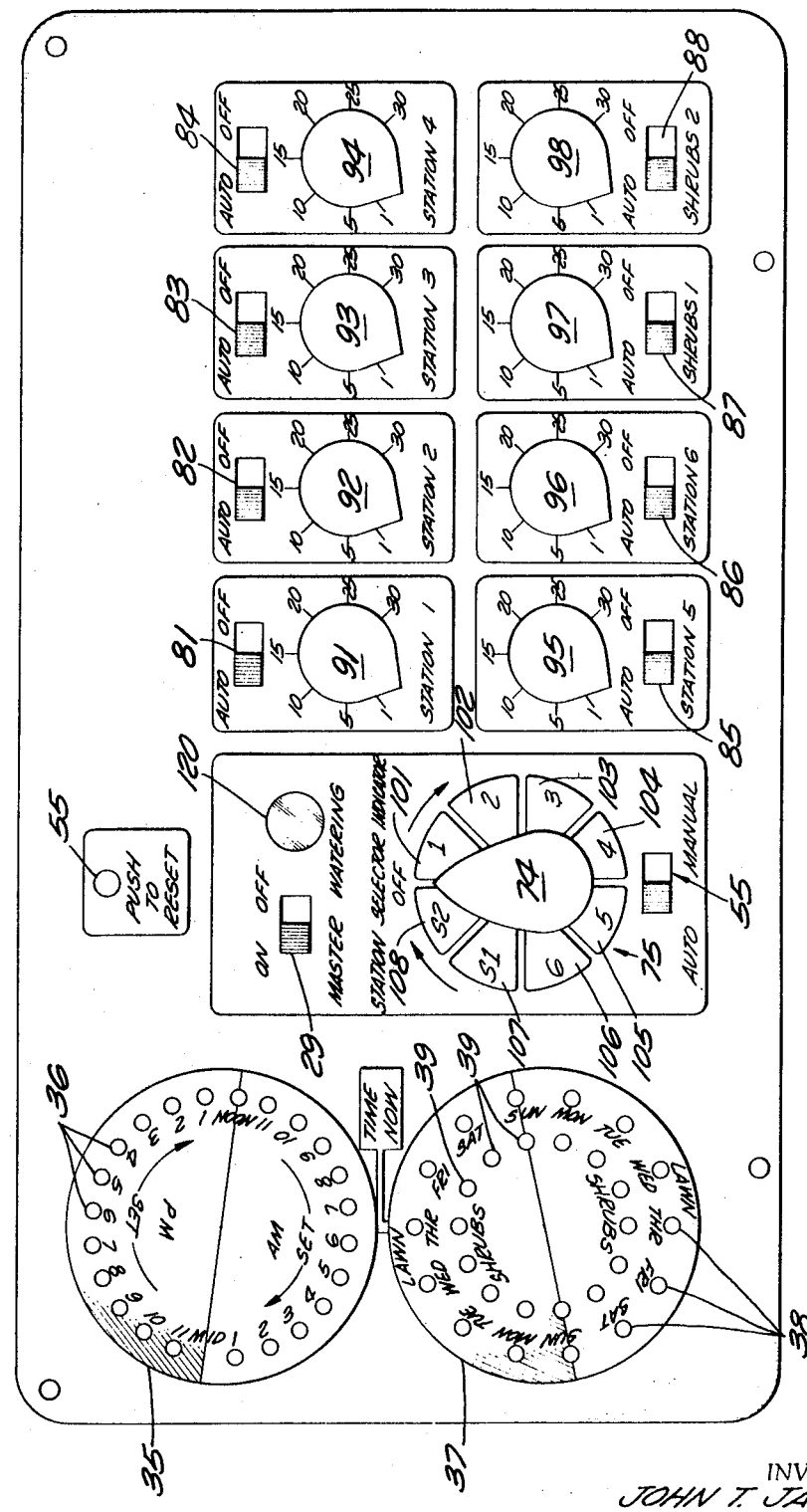

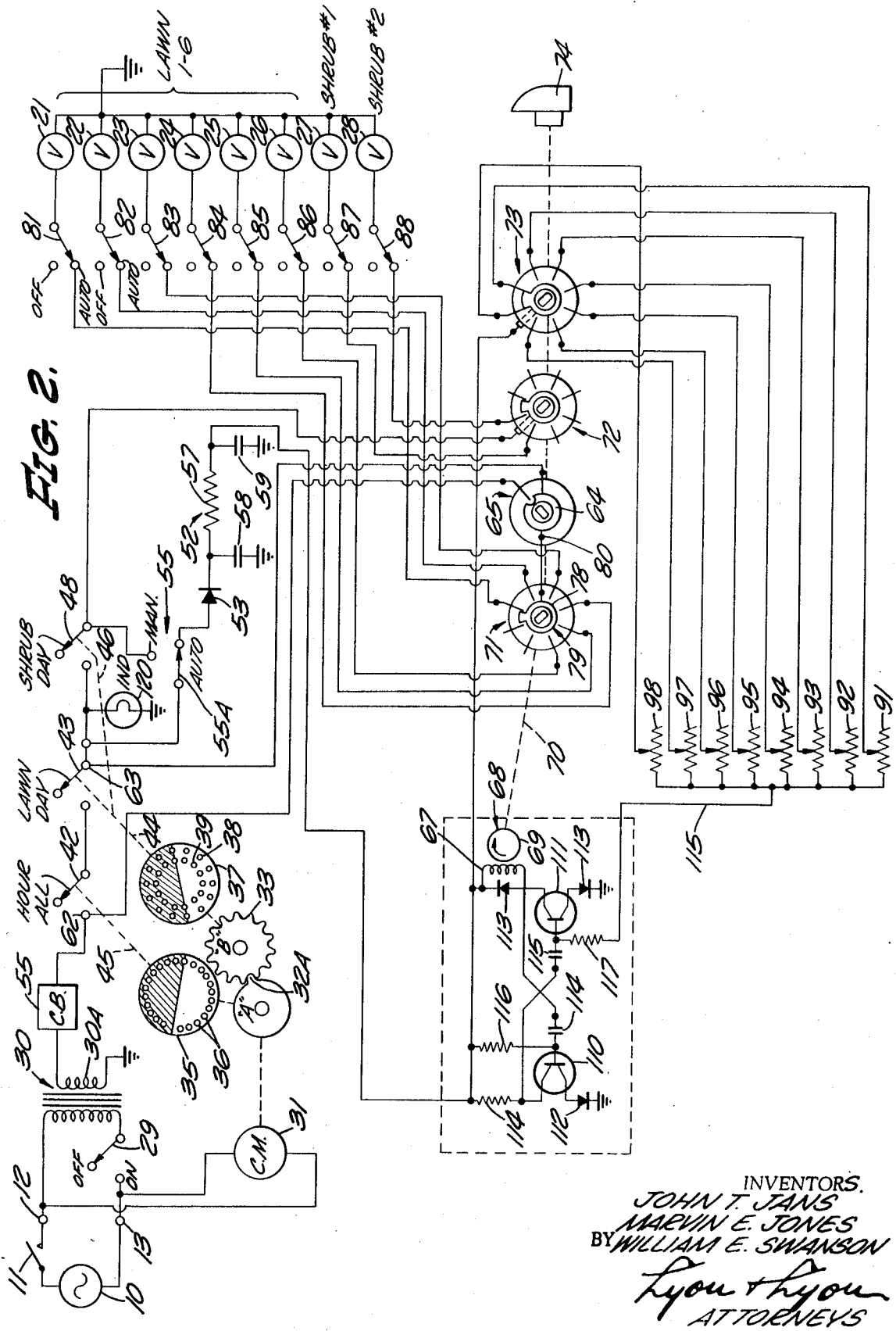

3,514,624
SPRINKLER SYSTEM AND VARIABLE TIMING MEANS
John T. Jans, 19321 E. Richardson, Glendora, Calif. 91740; Marvin E. Jones, Valinda, Calif. (P.O. Box 37, Glendora, Calif. 91740); and William E. Swanson, 1015 Carolyn Ave., San Jose, Calif. 95125
Continuation of application Ser. No. 532,450, Mar. 7, 1966. This application Mar. 10, 1969, Ser. No. 805,903
Int. Cl. H02j *3/14*
U.S. Cl. 307—41                          12 Claims

ABSTRACT OF THE DISCLOSURE

An automatic water sprinkling system with two rotatable discs mounting circumferentially spaced adjustable pins and a electrical circuit including a multivibrator connected to the motor. The motor shaft drives a plurality of wafer type switches associated with various operating stations. The system has a manual override.

---

This application is a continuation of application 532,450 filed Mar. 7, 1966 and now abandoned.

The present invention relates to improved means and techniques useful in programming events and is described herein in relationship to an automatic water sprinkling system in which sprinkler valves at a plurality of stations or locations are selectively energized at various selectable times of the day within a fourteen-day period and also with the duration of a sprinkling event being selectable and adjustable.

It will be appreciated that, while the invention is described in specific relationship to a sprinkling system, various aspects of the invention may be used for purposes other than controlling the flow of water.

Briefly, the system described herein involves two rotatable discs, one disc being rotated through one revolution each twenty-four hours and the second disc being geared to the first disc and being rotated through one revolution each fourteen days. Each of these two discs mounts circumferentially spaced adjustable pins which may be manually adjusted to cause actuation of a corresponding first and second switching means to thereby effect conditioning of an electrical circuit. This electrical circuit involves a multivibrator (hereinafter referred to as MV) operatively connected to a motor whose shaft is incrementally rotated in accordance with the timing of the MV. This motor shaft drives a plurality of wafer type switches, one of which is connected in parallel with the previously mentioned first and second switching means to assure continued energization of the previously mentioned conditioning circuit after rotation of one or more of the above mentioned discs. A second one of these wafer switches selects one of six watering stations, i.e., provides a connection to a solenoid valve at the corresponding station, these six stations being designated as lawn stations. A third one of such wafer switches controls the energization of a solenoid valve at a corresponding seventh and eighth watering station, designated herein as a shrub station. A fourth of such wafer switches selectively connects a corresponding one of eight resistances in the MV circuit and each of these eight resistances is manually adjustable to manually adjust the timing of the MV and hence the time during which a corresponding one of the solenoid valves is open for the flow of water to the corresponding station. In addition to these four wafer switches, the previously mentioned MV driven motor has its shaft connected to a manually operable station selector knob for providing a manual override and also such knob serves as an indicator during the above indicated automatic operation of the system. The valves at the two shrub stations are energized in this system as disclosed only in the event that the pins in the previously mentioned second disc are each adjusted for operation of a switch on the same day during this fourteen-day cycle.

It is therefore a general object of the present invention to provide a system of the character indicated above having the above mentioned features and operating to accomplish the above indicated results.

A specific object of the present invention is to provide an improved watering system.

Another object of the present invention is to provide improved means whereby time intervals in a programming arrangement may be adjusted using an adjustable electrical component such as an adjustable resistor.

Another object of the present invention is to provide an arrangement involving a MV timer-motor driven by such MV and means operated by the shaft of such motor, the latter means involving adjustable resistors which may be adjusted to effect the timing of the MV and thereby provide an arrangement wherein the motor shaft is driven at different speeds during different programming devices as established by adjustment of the previously mentioned resistors.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 illustrates an arrangement of controls on a panel of apparatus embodying features of the present invention;

FIG. 2 illustrates in schematic form the apparatus illustrated in FIG. 1 connected to a source of current and to eight solenoid valves for programming the flow of water to a corresponding one of eight watering stations.

The apparatus is energized from a convenient household source of alternating current represented by the source 10 and connectable by a switch 11 to the input terminals 12, 13 of the apparatus shown in FIG. 1. Such apparatus incorporates eight output terminals and one common ground terminal, one terminal of a corresponding solenoid valve 21, 22, 23, 24, 25, 26, 27 and 28 being connected to a corresponding output terminal, and the other terminal of each of these eight valves being interconnected and connected to ground.

The apparatus also incorporates a master on-off switch 29 which, when closed, energizes the primary winding of transformer 30 having a low voltage 24-volt winding 30A, one terminal of which is grounded. A conventional synchronous clock motor 31 is connected directly across the input terminals 12, 13 and this runs continuously and continuously drives a disc 32 one revolution during each twenty-four hours. This disc 32 is formed with a single gear tooth 32A which is engageable with a corresponding one of fourteen teeth on disc 33 for purposes of rotating the disc 33 once each fourteen days. Directly connected with disc 32 is the disc 35 having 23 adjustable pins 36 mounted thereon; one for each hour of the day except for the midnight hour. In like manner, disc 37 is connected to and is driven directly by disc 33 and such disc 37 mounts an outer and an inner series of adjustable pins 38 and 39, there being fourteen pins in each series 38, 39 corresponding to each of the fourteen days in the cycle. The outer circular arrangement of pins 38 has reference to lawn watering and the inner circularly arranged series of pins 39 has reference to shrub watering as explained in more detail later.

Each of the series of pins 36 thus represents a particular hour of the day and it may be manually adjusted to actuate a switch 42 at that particular hour. In similar fashion, each of the series of pins 38 representing a corresponding lawn day may be manually adjusted to actuate a switch 43 on that corresponding day as indicated by the dotted line 44, the previous interconnection between the pins 36 and switch 42 being designated by a like corresponding dotted line 45. In like fashion each of the inner series of pins 39 may be seelctively adjustable and is functionally interconnected as indicated by the dotted line 46 to operate a shrub day switch 48 on the corresponding day for which the corresponding pin on disc 37 is adjusted.

It will be seen that when switches 42 and 43 are both closed, a MV circuit 50 is energized by applying a DC voltage to the lead 51, such lead 51 being connected to the ungrounded terminal of transformer winding 30A through a circuit which includes a filter circuit 52, a rectifier 53, an "auto-manual" switch 55 which is a single pole-double throw switch having its movable arm 55A connected through switches 43 and 42 and circuit breaker 55 to such ungrounded terminal of winding 30A. This filter circuit 52 comprises a series resistance 57 and two capacitors 58, 59 each having one of its terminals grounded and the other one of its terminals connected to opposite terminals of resistance 57. It will thus be seen that the MV 50 is energized when the switch 55 is in its auto position and when a series circuit between terminals 62 and 63 is closed. This series circuit between terminals 62 and 63 is closed either when both switches 42 and 43 are closed or in the alternative, when the stationary contacts A, B are bridged by the metal ring portion 64 of wafer switch 65, it being noted that the contact B is connected to terminal 62 and the contact A is connected to terminal 63. This wafer switch 65 is caused to close as a result of energizing of the MV 50 which, when energized, serves to energize the field winding 67 of a station timer motor 68 having its armature indicated at 69, such armature 69 having its shaft connected, as indicated by the dotted line 70, to each of the movable elements of wafer switches 71, 65, 72, 73 and also knob 74. This knob 74, as seen in FIG. 1, cooperates with a stationary dial 75, such dial being in the form of eight sectors of the same distinguishing color and being designated in FIG. 1 as sectors 101–106 (corresponding to each of the six lawn stations) followed by sectors 107 and 108 (S1 and S2 corresponding to the two subsequent shrub stations).

The wafer switch 71 has its movable metal ring-shaped portion 78 connected via wiper contacts 79 and 80 to the previously mentioned movable ring portion 64, this ring portion 64 being connected to the contact A, a wiper arm or contact, and such contact A is energized when the previously mentioned switches 42, 43 are both closed or when contacts A, B are bridged by wafer switch element 64. The first six stationary contacts of wafer switch 71 are connected respectively to one terminal of each of the solenoid valves 21, 22, 23, 24, 25 and 26 through a corresponding single pole-double throw switch 81, 82, 83, 84, 85 and 86, the other two stationary contacts of switch 71 (contacts 7 and 8) being nonconnected but correspondingly the stationary contacts 7 and 8 of wafer switch 72 are connected respectively to one terminal of solenoid valves 27 and 28 through corresponding single pole-double throw switches 87 and 88. The movable wiper element of switch 72 is connected through lead 89 to one terminal of the previously mentioned shrub day switch 48 having its other stationary terminal connected to terminal 63. This energization of solenoid valves 27 and 28 requires closure of the time operated switch 48 when switch 55 is in its automatic position.

The fourth wafer switch 73 serves as a control for the timing of MV 50 in that it is used to insert one of the eight manually adjustable resistances 91, 92, 93, 94, 95, 96, 97 and 98 in the MV timing circuit. This will be more evident from the following description of the MV circuit 50.

MV 50 incorporates two transistors 110, 111 of the 2N696 type with each having its emitter electrode connected to ground through a corresponding diode 112, 113 of the 1N3253 type. The base electrode of transistor 110 is connected to the collector electrode of transistor 111 by capacitor 114; and likewise capacitor 115 interconnects the base electrode of transistor 111 to the collector electrode of transistor 110. The collector and base electrodes of transistor 110 are individually connected to lead 51 through a corresponding resistor 114, 116. Lead 51 is also connected through the field winding 67 of motor 68 to the collector electrode of transistor 111, such winding 67 being shunted by diode 113 of the 1N3253 type. Lead 51 is also connected to the movable wiper contact of wafer switch 73 which, in its "off" position shown in FIG. 2, contacts both of the stationary switch contacts 1 and 8 of switch 73. The eight stationary contacts (contacts 1–8) of switch 73 are connected respectively to a manually adjustable tap on a corresponding one of the resistances 91–98, one terminal of each of the resistances 91–98 being connected to a common lead 115 which is connected via resistance 117 to the base electrode of transistor 111.

This motor 68 is preferably a so-called "Enercon" motor manufactured and sold by Energy Conversion Systems Corporation, its Model 45 and referred to by it as a unidirectional single motor. This motor is sometimes referred to as an infinite resolution stepping motor and in general is driven by a U-shaped member vibrating in the field of an AC coil wtih the vibration being translated by unidirectional clutches into output shaft rotation.

In operation of the system, the clock motor 31 turns the hour dial 35 which carries the manually adjustable pins 36, adjustable for producing operation or non-operation of the associated switch 42 as desired. Once each day at midnight the toothed portion 32A engages one of the fourteen tooth portions of disc 33 to cause it and its connected dial 37 to turn through 1/14 of a revolution (corresponding to one day in a fourteen-day cycle). The dial 37 carries an inner and outer series of pins 38 and 39 which may be manually adjusted to operate or not operate the corresponding switch 43, 48 as desired. When the corresponding pin is in its "on" position on the hour dial 35, switch 42 is closed; likewise when the pin 38 is in its "on" position on the day dial 37, it causes the switch 43 to close. When both switches 42 and 43 are closed, an AC voltage appears at terminal 63 and such voltage is indicated by lighting of the indicator lamp 120. This AC voltage is applied through switch 55 in its automatic position to a rectifier 52, the output of which supplies a unidirectional voltage on lead 51 to MV 50 to thereby start operation of the MV. The MV 50 in its operation pulses the timer motor 68 which has its armature 69 and shaft 70 indicated by the dotted line 70 connected to the movable elements of wafer switches 71, 65, 72, 73 and knob 74. Each MV pulse turns these four wafer switches and knob 74 approximately one degree and it requires approximately forty of such MV pulses (40 MV cycles) to cause these switches and knob 74 to move through one station to the next, these stations being indicated also by the sectors 101–108 in FIG. 1. After slight movement of the motor shaft 70, the wafer switch 65 is closed and the MV circuit 50 is then assured of being energized after the clock motor 31 causes one or both of the switches 42, 43 to open. In general, the wafer switches 71 and 72 control the series of eight solenoid valves 21–28 (wafer switch 71 controlling valves 21–26 and wafer switch 72 controlling valves 27 and 28). The duration between MV pulses, i.e., timing of the MV is set by adjustment of the resistors 91–98. It will be observed that each of these controls 91–98 is connected in sequence in the MV timing circuit by wafer switch 73 which is of the shorting type so that at all times one of the controls 91–98 is in the circuit except during changeover when two adjacent controls are connected in parallel by the movable element of wafer switch 73.

After the MV 50 has pulsed approximately six times, i.e., has gone through six of its cycles, the transfer wafer switch 65 is closed so that the microswitches 42 and 43 under control of the hour and day dials 35 and 37 are no longer needed to maintain the pulser operating and the cycle will thus continue until all eight positions (six lawn, two shrub) have completed their operation. The microswitch 42 remains closed approximately ten minutes so that a watering schedule of ten minutes or more will not repeat during the same hour. If the automatic cycle does repeat during the same hour, it is then desirable to adjust an unused station to a long time so that the total time set on the controller for all stations is more than ten minutes.

As the MV 50 pulses the timer motor 68, the wafer switches 71, 65, 72 and 73 turn through a complete revolution, contacting in sequence stations 1 through 6 via switch 71 and shrub stations S1 and S2 via switch 72.

It is noted that each of the controls 91–98 may be adjusted for the time interval extending from 0–30 minutes. This will be evident from the following detailed description of the MV operation. When MV 110 conducts, the voltage at the base of MV 111 is approximately thirty volts negative, which prevents transistor 111 from conducting. However, the voltage across capacitor 115 slowly reduces at the rate determined by the time constant of the circuit which includes capacitor 115, resistances 117 and the particular resistances 91–98 connected in series with resistances 117. This voltage across capacitor 115 thus decreases at a controlled rate to a point where transistor 111 starts to conduct. The voltage at the collector electrode of transistor 111 drops rapidly which immediately lowers the voltage at the base of transistor 110. This causes conduction of transistor 110 to cease and causes the voltage of the base of transistor 111 to increase to slightly above zero, driving transistor 111 into a saturation condition. This causes a maximum current to flow through the timer motor coil 67 to advance the timer motor shaft 70 one step. The negative voltage at the base of transistor 110 immediately begins to reduce toward zero value through resistor 116. The time constant of the circuit including resistance 116 and capacitor 114 is approximately one-tenth of a second. As soon as the voltage at the base of transistor 110 approaches zero, transistor 110 begins conduction again and this causes a lowering of the voltage at the collector of transistor 110 to approximately zero. This reduced voltage immediately lowers the voltage at the base of transistor 111 to approximately 35 volts to thereby cut off conduction of transistor 111. The complete cycle is repeated for each pulse of the timer motor. It will thus be seen that the time duration between pulses is set by the adjusted value of the particular resistor 91–98. In this operation a knob 74 is, of course, turned and it serves as an indication of the particular watering station being operated. This knob 74 may be manually adjusted at any particular time to any particular station since it is mechanically coupled to the movable element of each of the four wafer switches 71, 65, 72 and 73 and such movement is not restrained by the armature 69 of the timing motor. In a practical device constructed in accordance with the present invention, during an automatic watering cycle, a distinct click is heard periodically. The time between clicks varies from 1–30 seconds, depending upon the dial setting for the particular station operating at that time. By adjusting the particular resistances 91–98 to the minimum time, the duration between clicks is shortened and consequently watering at the corresponding station is shortened. It will be observed that the shrub stations S1 and S2 operate only after the six lawn stations have completed their cycle and will only operate if the pin on the shrub cycle on the day dial has been turned in to a position wherein the shrub switch 48 is closed. For those days when the shrub pin has not been turned in, the times set on resistors 97 and 98 have their effect in the automatic cycle but there will be no watering of the shrubs at stations S1 and S2 because valves 27 and 28 are not energized, i.e., switch 48 remains open.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. In a system of the character described, a multivibrator circuit producing output pulses; a plurality of means for adjusting the timing of said output pulses; and switching means operated by said multivibrator for sequential selection of said adjusting means.

2. In a system of the character described, a multivibrator including a timing circuit therefor which may be adjusted to adjust the periodicity of pulses produced by said multivibrator; sequentially operated switching means operable sequentially to different positions; switch operating means connected to said multivibrator for operating said switching means to different ones of its sequential positions for a time duration equal to a predetermined number of said pulses; and adjustable means connectable in said timing circuit by said switching means for adjusting the periodicity of said pulses and thereby said time duration.

3. A system as set forth in claim 2 including a plurality of utilization means, and additional sequentially operated switching means also operated by said operating means for sequentially selecting ones of said utilization means.

4. A system as set forth in claim 3 including clock controlled switching means connected in series with said additional switching means, and a switching means operated by said operating means connected in parallel with said clock controlled switching means.

5. A system as set forth in claim 2 including a knob moved by said operating means for operating said switching means regardless of the condition of said operating means.

6. A system as set forth in claim 4 in which said clock controlled switching means includes two switches connected in series with one of the last mentioned switches being operated in accordance with a particular day and the other being operated in accordance with a particular hour of that day; a third switch operated in accordance with a particular day; operation of said two switches being effective to energize said multivibrator; utilization means; and said third switch being connected in series with the last mentioned utilization means.

7. In a system of the character described, an oscillator circuit producing output pulses; a plurality of means for adjusting the timing of said output pulses; and switching means operated by said oscillator for sequential selection of said adjusting means.

8. In a system of the character described, an oscillator including a timing circuit therefor which may be adjusted to adjust the periodicity of pulses produced by said oscillator; sequentially operated switching means operable sequentially to different positions; switch operating means connected to said oscillator for operating said switching means to different ones of its sequential positions for a time duration equal to a predetermined number of said pulses; and adjustable means connectable in said timing circuit by said switching means for adjusting the periodicity of said pulses and thereby said time duration.

9. A system as set forth in claim 8 including a plurality of utilization means, and additional sequentially operated switching means also operated by said operating means for sequentially selecting ones of said utilization means.

10. A system as set forth in claim 9 including clock controlled switching means connected in series with said additional switching means, and a switching means operated by said operating means connected in parallel with said clock controlled switching means.

11. A system as set forth in claim 8 including a knob moved by said operating means for operating said switching means regardless of the condition of said operating means.

12. A system as set forth in claim 10 in which said clock controlled switching means includes two switches connected in series with one of the last mentioned switches being operated in accordance with a particular day and the other being opearted in accordance with a particular hour of that day; a third switch operated in accordance with a particular day; operation of said two switches being effective to energize said oscillator; utilization means; and said third switch being connected in series with the last mentioned utilization means.

References Cited
UNITED STATES PATENTS

| | | | |
|---|---|---|---|
| 2,786,942 | 3/1957 | Fuller | 331—144 |
| 3,004,199 | 10/1961 | Sakson | 331—144 X |
| 3,200,303 | 8/1965 | Maxwell | 317—142 |
| 3,309,543 | 3/1967 | Alston et al. | 307—41 X |

ROBERT K. SCHAEFER, Primary Examiner

H. J. HOHAUSER, Assistant Examiner